United States Patent
Kaneda et al.

(10) Patent No.: US 11,073,495 B2
(45) Date of Patent: Jul. 27, 2021

(54) BIOSENSOR AND MANUFACTURING METHOD OF BIOSENSOR

(71) Applicants: ARKRAY, Inc., Kyoto (JP); Ultizyme International Ltd., Tokyo (JP)

(72) Inventors: Hisashi Kaneda, Kyoto (JP); Junko Shimazaki, Tokyo (JP)

(73) Assignees: ARKRAY, Inc., Kyoto (JP); Ultizyme International Ltd., Tokyo (JP)

( * ) Notice: Subject to any disclaimer, the term of this patent is extended or adjusted under 35 U.S.C. 154(b) by 0 days.

(21) Appl. No.: 15/293,353

(22) Filed: Oct. 14, 2016

(65) Prior Publication Data

US 2017/0108460 A1    Apr. 20, 2017

(30) Foreign Application Priority Data

Oct. 15, 2015 (JP) ............... JP2015-204036
Sep. 29, 2016 (JP) ............... JP2016-191802

(51) Int. Cl.
*G01N 27/327* (2006.01)
*G01N 27/30* (2006.01)

(52) U.S. Cl.
CPC ....... *G01N 27/3274* (2013.01); *G01N 27/301* (2013.01); *G01N 27/308* (2013.01); *G01N 27/3272* (2013.01)

(58) Field of Classification Search
CPC .. G01N 27/40; G01N 27/3272; G01N 27/327; G01N 27/48; G01N 27/26; C12Q 1/00; C12Q 1/02; C12Q 1/006; C12Q 1/34; C12Q 1/54; A61B 5/150274; A61B 5/05; A61B 5/14532
See application file for complete search history.

(56) References Cited

U.S. PATENT DOCUMENTS

| | | | |
|---|---|---|---|
| 5,512,159 A | 4/1996 | Yoshioka et al. | |
| 5,770,439 A * | 6/1998 | Bilitewski | C12Q 1/002 204/403.11 |
| 6,287,451 B1 | 9/2001 | Winarta et al. | |
| 2001/0017269 A1* | 8/2001 | Heller | C12Q 1/005 205/777.5 |
| 2004/0067166 A1* | 4/2004 | Karinka | B01L 3/502723 422/82.03 |

(Continued)

FOREIGN PATENT DOCUMENTS

| | | |
|---|---|---|
| EP | 2012121 A1 | 1/2009 |
| EP | 3078965 A1 | 10/2016 |

(Continued)

OTHER PUBLICATIONS

Extended European Search Report issued in corresponding European Patent Application No. 16194042.4 dated Feb. 22, 2017.

(Continued)

*Primary Examiner* — Gurpreet Kaur
(74) *Attorney, Agent, or Firm* — Morgan, Lewis & Bockius LLP

(57) ABSTRACT

A biosensor includes a plurality of electrodes including a working electrode, and a detection layer containing an enzyme for exchanging electrons with the working electrode, a crosslinking agent and an electrically conductive polymer and having a contact area with the working electrode defined by a predetermined area.

8 Claims, 8 Drawing Sheets

(56) References Cited

U.S. PATENT DOCUMENTS

| | | | |
|---|---|---|---|
| 2006/0278537 A1* | 12/2006 | Cai | C12Q 1/006 205/777.5 |
| 2009/0008248 A1 | 1/2009 | Shimomura et al. | |
| 2009/0321277 A1 | 12/2009 | Heller et al. | |
| 2010/0243441 A1 | 9/2010 | Groll | |
| 2010/0276285 A1 | 11/2010 | Fujii et al. | |
| 2012/0273368 A1* | 11/2012 | Tsukada | C12Q 1/004 205/775 |
| 2013/0098775 A1 | 4/2013 | Pei et al. | |
| 2014/0186548 A1 | 7/2014 | Fujii et al. | |
| 2016/0177365 A1 | 6/2016 | Katsuki | |
| 2016/0186230 A1* | 6/2016 | Kaneda | C12Q 1/006 204/403.14 |

FOREIGN PATENT DOCUMENTS

| | | |
|---|---|---|
| EP | 3086113 A1 | 10/2016 |
| JP | H05-196595 A | 8/1993 |
| JP | 2005-147990 A | 6/2005 |
| JP | 4060078 B2 | 3/2008 |
| JP | 2009-014485 A | 1/2009 |
| JP | 2012-522226 A | 9/2012 |
| TW | 201514486 A | 4/2015 |
| WO | 00/42422 A1 | 7/2000 |
| WO | 00/73785 A2 | 12/2000 |
| WO | 2009/057791 A1 | 5/2009 |
| WO | 2013/144255 A1 | 10/2013 |
| WO | 2015/020149 A1 | 2/2015 |

OTHER PUBLICATIONS

Office Action issued in corresponding European Patent Application No. 16194042.4 dated Aug. 3, 2018.

Office Action issued in corresponding Chinese Patent Application No. 201610900054.2 dated Sep. 3, 2019.

Office Action issued in counterpart Japanese Patent Application No. 2016-191802 dated Apr. 28, 2020.

Office Action issued in counterpart Chinese Patent Application No. 201610900054.2 dated Jun. 1, 2020.

Office Action issued in counterpart European Patent Application No. 16194042.4 dated Nov. 5, 2020.

* cited by examiner

EXAMPLE 1

BIOSENSOR AND MANUFACTURING METHOD OF BIOSENSOR

CROSS-REFERENCE TO RELATED APPLICATION

This application claims the benefit of Japanese Patent Application No. 2015-204036 filed on Oct. 15, 2015 and No. 2016-191802 filed on Sep. 29, 2016 in the Japanese Patent Office, the disclosure of which is herein incorporated in its entirety by reference.

FIELD

The present invention relates to a biosensor and a method of manufacturing a biosensor.

BACKGROUND

Biosensors are conventionally known to have a reagent layer containing at least an oxidoreductase and an electron transfer mediator (also called "electron transfer substance", "electron carrier") disposed on two or more electrodes formed on an insulating base plate. In the biosensor of this type, electrons are first exchanged between a substance to be measured and the oxidoreductase and the electrons are further transferred to the electrodes via the electron transfer mediator, whereby a value of the electric current generated is measured.

Examples of the biosensor, which uses the reagent layer containing the electron transfer mediator as described above, include biosensors in which a reagent layer containing glucose dehydrogenase as the enzyme and potassium ferricyanide or the like as the electron carrier is formed on a counter electrode, a measurement electrode and a detector electrode (e.g., see Patent document 1). In this biosensor, the reagent layer containing the enzyme and the electron carrier is dissolved in blood absorbed in a specimen supply channel, allowing an enzyme reaction to proceed with glucose, which is the substrate in blood, whereby the electron carrier is reduced to form a reduced electron carrier. The reduced electron carrier is electrochemically oxidized and a glucose concentration in blood is measured based on an electric current value obtained during the oxidization.

Sensitivity of the biosensor, which uses a reagent layer containing an electron transfer mediator, depends on the contact area of a sample, in which the reagent layer is dissolved, with the working electrode between which electrons are exchanged. For this reason, when the contact areas of samples with the working electrode are inconsistent, the sensitivity of biosensors varies. However, the reagent layer is dissolved in the sample and the reagent is then diffused, consequently making it difficult to maintain consistent contact areas of the samples with the working electrode. Considering these problems, for example, there is a biosensor which is provided with a reagent layer containing an enzyme and an electron transfer substance (e.g., ruthenium complexes and iron complexes) and includes a first regulatory element for regulating a contact area with a sample at the working electrode and a second regulatory element for regulating an effective area for exchanging electrons at at least one of the working electrode and the counter electrode (e.g., see Patent document 2). In the biosensor described in Patent document 2, the sensitivity inconsistency is reduced because the effective area at the working electrode is made consistent.

Further prior art pertinent to the present application includes the following electrode strip. The electrode strip includes a reagent forming layer, which is formed smaller than a base unit layer, has at least three holding cutouts between a first strip end and a vent opening, has a part of the base unit layer including at least three electrodes exposed at a second strip end, and is laid on the base unit layer so that the at least three electrodes are exposed at the at least three holding cutouts. The electrode strip further contains a first reagent, which is disposed within the holding cutout among the at least three holding cutouts, in which the reference electrode among the at least three electrodes is exposed and causes a first working electrode and a second working electrode among the at least three electrodes to function; a second reagent, which is disposed within the holding cutout among the at least three holding cutouts, in which the second working electrode is exposed and contains an enzyme which acts on a specimen as the substrate; and a third reagent, which is disposed within the holding cutout among the at least three holding cutouts, in which the first working electrode is exposed and does not contain an enzyme (e.g., see Patent document 3). Note that the biosensor described in Patent document 3 is also the type of biosensor which uses a reagent layer containing an electron transfer mediator, and the use of at least one of ferrocene, potassium ferricyanide and other ferrocene derivatives as the electron transfer mediator (redox mediator) is described.

A method is recently found for measuring a substance using a biosensor in which a sample is introduced into an electrochemical measurement cell wherein a reagent layer containing at least an oxidoreductase is disposed on at least one of two or more electrodes formed on an insulating base plate, a voltage is applied to the electrodes, a charge transfer limiting current generated due to the transfer of electrons from the substance to be measured in the sample to the electrode is detected, and the concentration of the substance to be measured contained in the sample based on the charge transfer limiting current is determined. In the measurement method described above, a reagent layer which does not contain an electron transfer mediator is used (e.g., see Patent document 4).

[Patent document 1] Japanese Patent Laid-Open No. 2005-147990
[Patent document 2] International Publication NO. WO2009/057791
[Patent document 3] Japanese Patent No. 4060078
[Patent document 4] International Publication NO. WO2015/020149

SUMMARY

In the enzyme electrode which measures a charge transfer limiting current (called "charge transfer limiting enzyme electrode") as disclosed in Patent document 1, the response electric current value varies depending on the contact area of the reagent layer with the electrode. Thus, for example, in the manufacturing steps of a charge transfer limiting enzyme electrode, when the reagent layer is formed simply by dropping a reagent onto the electrode, the contact areas of the reagent layer with the electrode become inconsistent. As a result, response electric current values were inconsistent between enzyme electrodes (biosensor), in other words, satisfactory measurement accuracy (sometimes called simultaneous repeatability) was not likely to be achieved.

Note that the art disclosed in Patent document 3 does not use a charge transfer limiting enzyme electrode and the measurement method of a response electric current is different. In the art disclosed in Patent document 3, according to the difference in measurement methods, the first reagent, the second reagent and the third reagent are applied to the reference electrode, the first working electrode and the second working electrode, respectively. Additionally, for the purpose of correcting the influence caused by an interfering substance such as ascorbic acid, uric acid or acetaminophen, the at least three holding cutouts are provided for the areas of the first working electrode and the second working electrode exposed at the holding cutouts to be the same. Thus, the measurement method of a substance to be measured using the charge transfer limiting enzyme electrode is not even suggested.

The present invention has an object to provide a biosensor capable of improving the measurement accuracy of a substance to be measured and a manufacturing method of a biosensor.

One of aspects of the invention is a biosensor. The biosensor includes a plurality of electrodes including a working electrode, and a detection layer containing an enzyme for exchanging electrons with the working electrode, a crosslinking agent and an electrically conductive polymer and having a contact area with the working electrode defined by a predetermined area.

In the biosensor, a material for the detection layer applied to the working electrode over the predetermined area may be solidified on the working electrode.

The biosensor may further includes an insulation layer that covers the working electrode leaving an opening in which the working electrode is exposed, wherein the opening is filled with the detection layer.

In the biosensor, the detection layer may be immobilized on the working electrode over a contact area corresponding to a reaction rate of the enzyme. The aspects of the present invention include a biosensor unit including a plurality of biosensors, each of which is the biosensor as described above, wherein the enzyme in each biosensor may have the same reaction rate and the contact area is approximately the same.

The aspects of the present invention include a method of manufacturing a biosensor, comprising forming a plurality of electrodes including a working electrode on an insulating base plate; and forming, on the working electrode, a detection layer containing an enzyme, a crosslinking agent and an electrically conductive polymer for exchanging electrons with the working electrode and having a contact area with the working electrode defined by a predetermined area.

In the method of manufacturing a biosensor, the forming the detection layer on the working electrode may include application of a material for the detection layer to the working electrode.

In the method of manufacturing a biosensor, the forming the detection layer on the working electrode may include covering an upper part of the working electrode with an insulation layer leaving an opening in which the working electrode is exposed and filling the opening with the material for the detection layer.

According to the present invention, it provides a biosensor capable of improving the measurement accuracy of a substance to be measured.

DESCRIPTION OF EMBODIMENTS

Figure 1:
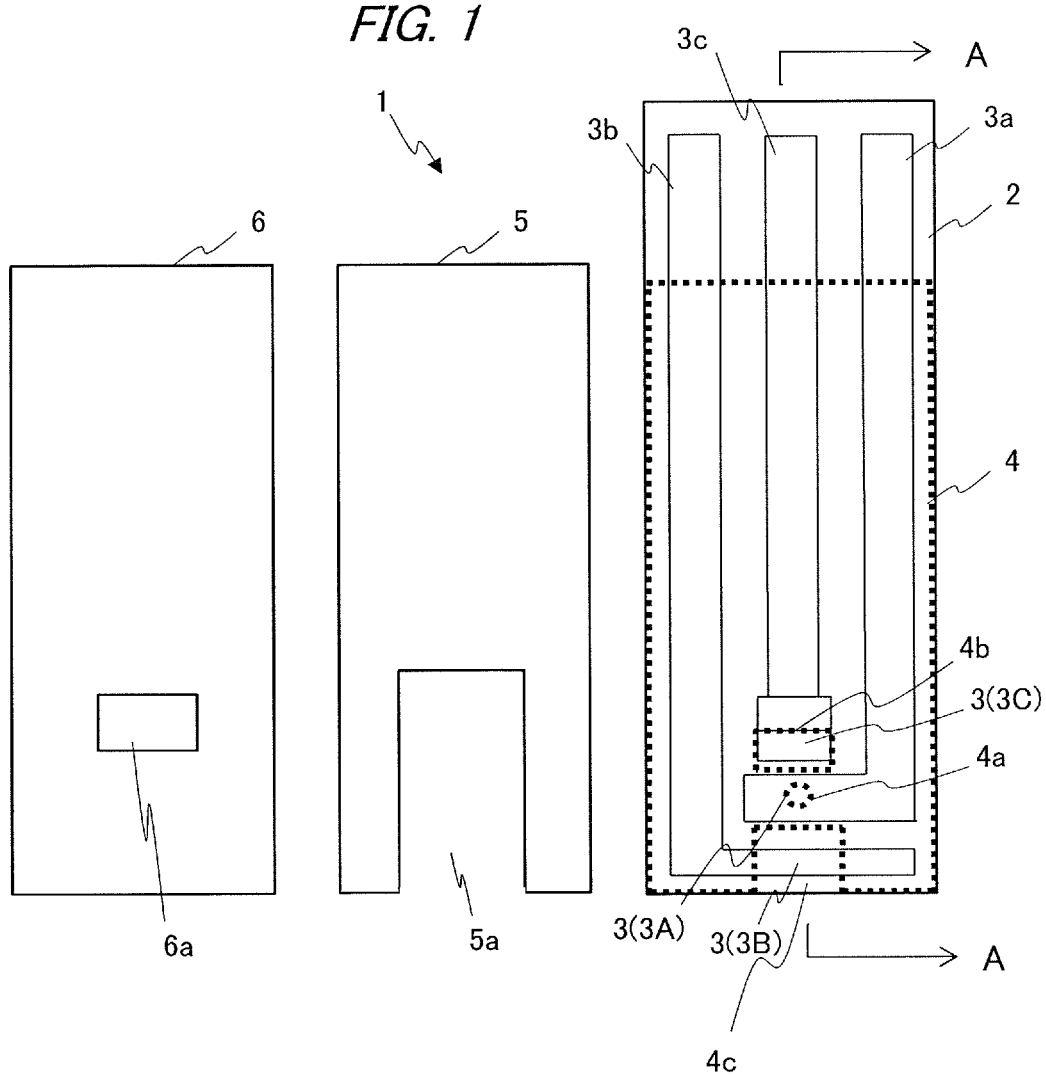
FIG. 1 is a drawing illustrating an example of the configuration of the biosensor according to an embodiment.

Hereinafter, embodiments of the present invention will be described with reference to the drawings. The configurations of the following embodiments are illustrative, and the present invention is not limited thereto.

The biosensor according to the embodiment includes a plurality of electrodes including a working electrode, and a detection layer containing an enzyme, a crosslinking agent and an electrically conductive polymer for exchanging electrons with the working electrode and immobilized on the working electrode with a contact area with the working electrode being controlled.

The substance to be measured by the biosensor of the embodiment is not particularly limited as long as a substance is measurable using the biosensor. The substance to be measured is preferably a substance of a biological origin and can be an indicator for a disease or health conditions. Examples of the substance to be measured include glucose, cholesterol and the like. The sample is not particularly limited as long as it contains the substance to be measured. The sample is preferably a biological sample. Examples of the biological sample include blood, urine and the like.

The measurement object of the biosensor according to the embodiment is a charge transfer limiting current based on the transfer of the electrons from the substance to be measured to the electrode. The charge transfer limiting current is an electric current generated when electrons from the enzyme are transferred to the electrode due to the reaction of the enzyme with the substance to be measured. The charge transfer limiting current is a time-independent steady-state current, and is preferably a steady-state current after the occurrence of the transient current due to the charging of an electric double layer.

The charge transfer limiting current is represented by the following formula (1). The formula (1) reveals that the electric current is proportional to the concentration of the substrate and to the enzyme reaction rate constant. When the constant term is defined as X, the formula (1) can be expanded to a formula (2). Note that the constant term X may include a correction coefficient or the like, although not appeared in the formulae (1) and (2).

[Expression 1]
[Expression 2]

The formula (1) is derived, taking the initial rate formula of the enzyme reaction and the formula of the electron transfer rate from the enzyme to the electrode into the consideration, by expanding the formulae when the values of these formulae are equal. The biosensor according to the embodiment, for example, measures a concentration of a substance to be measured (substrate) using the above formula (1) and formula (2).

[formula (1)]

$$i = \frac{nFAC_s^0 Kcat\tau_E}{Km} \quad (1)$$

i: current (A),
n: the number of reaction elections (eq/mol),
F: Faraday constant (96, 485 C/eq),
A: electrode area (cm$^2$),
$C_s^0$: consentration (mol/cm$^3$) of substrate (S),
$\tau_E$: oxygen content (mol),
Kcat/Km: oxygen reaction rate constant

[formula (2)]

$$i = X \cdot \frac{K_{cat}}{Km} \cdot C_s^0 \quad (2)$$

The formula (1) is a formula of charge transfer limiting current, which does not include the diffusion coefficient included in the Cottrell current of the initial rate formula of the enzyme reaction. As revealed in the formula (1), the electric current is proportional to the enzyme reaction rate constant. In the measurement method of a substance to be measured according to the embodiment, electrons are transferred to the electrode without being mediated by an oxidation reduction reaction by a mediator such as an electron acceptor substance. Thus, it is revealed that the charge transfer limiting current is not affected by the diffusion of the substance or does not depend on time.

Note that the electrode system can be confirmed to be the charge transfer limiting by examining the presence or absence of a peak and the pattern of current increase due to the sweep direction of the voltage using cyclic voltammetry or the like.

The detection layer of the biosensor according to the embodiment contains an enzyme, a crosslinking agent and an electrically conductive polymer, but not an electron transfer mediator. For measuring the charge transfer limiting current, the working electrode is preferably a "direct electron transfer-type enzyme electrode". The "direct electron transfer-type enzyme electrode" as used herein refers to a type of an enzyme electrode in which electrons are exchanged between the enzyme and the electrode in such a way that electrons generated by an enzyme reaction in a detection layer (a reagent layer) are directly transferred to the electrode without the involvement of an oxidation reduction substance such as an electron transfer mediator (mediated by an electrically conductive polymer in some cases).

Within the detection layer, the molecules of the enzyme are crosslinked by a crosslinking agent and further have a complicatedly interwined structure due to the electrically conductive polymer. The electrons generated by the enzyme reaction can be transferred to the electrode directly or along the electrically conductive polymer having electrical conductivity. As described above, in the biosensor according to the embodiment the electrons are exchanged between the enzyme and the electrode by the direct electron transfer in the detection layer.

Note that, in the physiological reaction system, the limiting distance within which the direct electron transfer occurs is considered from 1 to 2 nm. Even in the electron exchange in an electrochemical reaction system consisting of an electrode and an enzyme, the electron exchange on the electrode becomes difficult to detect unless the transfer of a mediator (e.g., transfer by diffusion) is involved in the case where the distance between the electrode and the enzyme is farther apart than the above limiting distance. Consequently, within the detection layer, the active sites (the site at which electrons are generated by an enzyme reaction) of the enzyme and the electrically conductive sites of the electrically conductive polymer are located within a distance suitable for the electron transfer. Specifically, the electrically conductive sites and the active sites are located close enough so that electrons are suitably transferred therebetween.

In the biosensor according to the embodiment, the detection layer having a contact area with the working electrode defined by a predetermined area is formed on the working electrode. Specifically, the contact area of the working electrode with the detection layer is defined. The contact area of the detection layer with the working electrode can be defined by applying (painting) a detection layer material to the working electrode among a plurality of the electrodes, but not simply dropping a liquid detection layer material. With this procedure, the "A: electrode surface area" and "n: reaction electron number" in the formula (1) can be defined. Thus, inconsistencies of the response electric currents between individual biosensors are reduced and the simultaneous repeatability can be improved.

For defining the contact area of the detection layer with the working electrode, the formation of an insulation layer on the insulating base plate on which the electrodes are formed can be presented as an example. The insulation layer is formed so that the working electrode is exposed at the bottom surface thereof and has an opening which is filled with the detection layer material. The opening has a connected inner wall surface to regulate, within the opening, the diffusion range of the detection layer material with which the opening is filled. When the material of the detection layer with which the opening is filled is solidified by drying or the like, the detection layer with which the opening is filled (burying the opening) is formed. The bottom area of the opening has a size that matches the contact area of the detection layer with the working electrode, and the opening is filled with the detection layer material in at least an amount of sufficiently burying the bottom of the opening. With this procedure, the detection layer having the defined contact area with the working electrode (contacting the working electrode over a predetermined area) can be easily formed on the working electrode. The insulation layer can be formed, for example, by screen printing using a nonconductive ink (also called a resist ink). The insulation layer can also be formed, in addition to the screen printing, by processes using various resists such as photoresists and insulating tapes or the like as long as the opening capable of defining the contact area of the working electrode with the detection layer can be formed.

As another usage, the contact area of the detection layer with the working electrode can be determined corresponding to the reaction rate of an enzyme. The reaction rate of an enzyme may vary by lots with different specific activities. For this reason, the areas of the detection layer and working electrode corresponding to the reaction rate of an enzyme are determined in advance by experiments or the like, and the detection layer is formed over the contact area corresponding to the reaction rate of the enzyme by each lot. With this procedure, the inconsistencies of the simultaneous repeatability by lots can be reduced.

Hereinafter, an example of the biosensor according to an embodiment is described.

<Configuration of Biosensor>

Figure 2:
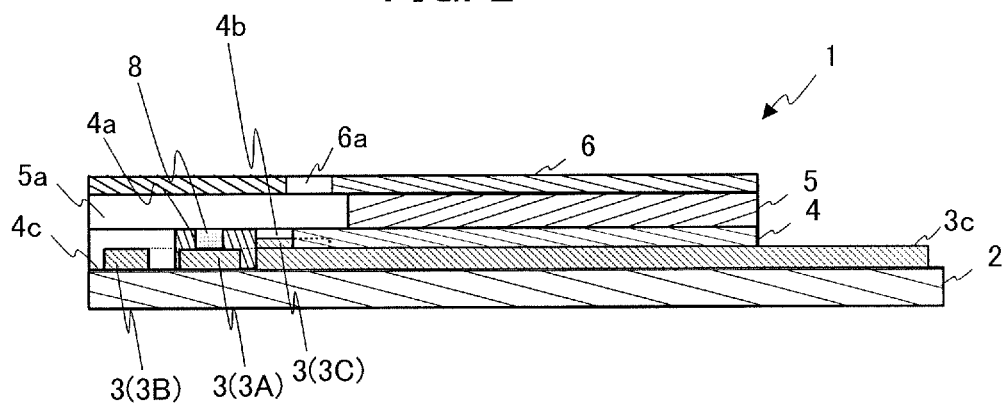
FIG. 2 is a sectional view of the biosensor illustrated in FIG. 1 taken along line A-A.

FIG. 1 is a drawing schematically illustrating a configuration of the biosensor including an enzyme electrode according to an embodiment and FIG. 2 is a sectional view of the biosensor illustrated in FIG. 1 in a laminated state when cut along line A-A.

As illustrated in FIG. 1 and FIG. 2, a biosensor 1 includes an enzyme electrode including an insulating base plate 2, a plurality of electrodes 3 (a working electrode 3A, a counter electrode 3B, a reference electrode 3C) formed on the insulating base plate 2, and an insulation layer 4 (depicted by a dotted line in FIG. 1) covering a part of the plurality of electrodes 3, a spacer 5 and a cover 6. The biosensor 1 is formed by laminating and integrating the enzyme electrode, the spacer 5 and the cover 6. The combination of the insulating base plate 2 and the electrode 3 is called "base material".

<<Enzyme Electrode>>

The enzyme electrode, as described above, consists of the insulating base plate 2, the electrode 3 and the insulation layer 4.

(Insulating Base Plate)

The insulating base plate 2 is formed in the form of a flat plate having a longitudinal direction and a width direction. The insulating base plate 2 is made of, for example, a thermoplastic resin such as polyetherimide (PEI), polyethylene terephthalate (PET) and polyethylene (PE), various resins (plastics) such as polyimide resins and epoxy resins, or insulating materials such as glasses, ceramics and papers.

(Electrodes)

The electrode 3 is formed on one surface of the insulating base plate 2. The electrode 3 consists of the working electrode 3A and the counter electrode 3B in the shape of band, each extending in a width direction of the insulating base plate 2, and the reference electrode 3C. The working electrode 3A, the counter electrode 3B and the reference electrode 3C are disposed in the order of the counter electrode 3B, the working electrode 3A and the reference electrode 3C from one end (the lower end in FIG. 1) toward the other end (the upper end in FIG. 1) in the longitudinal direction of the insulating base plate 2.

The working electrode 3A and the counter electrode 3B are each integrally formed with a lead unit 3a and a lead unit 3b extending in the longitudinal direction of the insulating base plate 2. The reference electrode 3C is formed on one end part (the lower end in FIG. 1) of a lead unit 3c extending in the longitudinal direction of the insulating base plate 2.

The working electrode 3A, the counter electrode 3B and each of the lead units 3a, 3b and 3c can be formed using, for example, a metallic material such as gold (Au), platinum (Pt), silver (Ag) or palladium, or a carbon material such as carbon. The reference electrode 3C is formed using, for example, silver/silver chloride (Ag/AgCl). The reference electrode 3C can also be formed using the same materials as the working electrode 3A and the counter electrode 3B.

Note that various known materials are also applicable to be the electrode material which constitutes the electrode 3 and the material for the insulating base plate 2. The size and thickness of the electrode 3 and the insulating base plate 2 can be determined as appropriate.

(Insulating Layer)

As illustrated in FIG. 1, one surface of the insulating base plate 2 on which the electrode 3 is formed is covered with the insulation layer 4. The insulation layer 4 has an opening 4a, an opening 4b, and an opening 4c. The opening 4a is formed on the working electrode 3A so that a part of the working electrode 3A is exposed.

The opening 4a, as illustrated in FIG. 2, is the space for forming the detection layer 8 and the detection layer 8 is formed within the opening 4a. In the example of FIG. 2, the opening 4a is formed in the configuration to have a circular planar shape and a connected inner wall surface (cylindrical side surface). The bottom area of the opening 4a is formed on the working electrode 3A so as to match the contact area of the detection layer 8, which contacts the working electrode 3A. When the detection layer 8 is formed using the opening 4a having the defined bottom area, the contact area of the working electrode 3A with the detection layer 8 is defined. Details of the component elements forming the detection layer 8 are described later.

The planar shape of the opening 4a is circular in the example illustrated in FIG. 1 and the inner wall surface is a cylindrical side surface. However, the opening 4a may be formed in the shape of a taper with the inner wall surface being a truncated cone side surface. The planar shape and the shape of the inner wall surface of the opening 4a can be determined as appropriate as long as the connected inner wall surface, which regulates the diffusion range of the detection layer material with which the opening is filled, can be formed. For example, the planar shape of the opening 4a may be elliptical, triangle, quadrangle or polygon consisting of five or more sides. Additionally, the shape of the inner wall surface of the opening 4a may be a pillar side surface corresponding to the planar shape or a pillar side surface not corresponding to the planar shape. Specifically, the shape of the opening 4a can be determined as appropriate as long as the contact area of the detection layer 8 with the working electrode 3A can be defined to be a predetermined area.

The opening 4b is formed so that a part of the reference electrode 3C and a part of the insulating base plate 2 are exposed. Similarly, the opening 4c is formed so that a part of the counter electrode 3B and a part of the insulating base plate 2 are exposed. The areas of the opening 4b and the opening 4c do not particularly need to be defined. Note that the other end part of the longitudinal direction of the insulating base plate 2 is not covered with the insulation layer 4, and each of the exposed lead units 3a, 3b and 3c is used as an electrode extraction unit.

The insulation layer 4 is formed by, for example, screen printing using a resist ink (a nonconductive ink), or using an insulating film. Examples of the resist ink applicable include insulation resin polyester inks (UVF series manufactured by Asahi Chemical Research Laboratory Co., Ltd.). Examples of the insulating film applicable include ZEOCOAT CP1010 (Zeon Corporation). Alternatively, it is conceivable to dispose a resin plate, on which notches equivalent to the openings 4a, 4b and 4c are formed, between the spacer 5 and the electrode 3.

<<Spacer>>

The spacer 5 is formed in the shape of a flat plate having a longitudinal direction and a width direction, and a slit 5a is formed at one end part (the lower end part in FIG. 1) thereof. The spacer 5 is laminated and immobilized on the insulation layer 4. At this time, the counter electrode 3B and the reference electrode 3C are exposed within the slit 5a, and the detection layer 8 formed (immobilized) within the opening 4a is exposed.

<<Cover>>

The cover 6 is formed in the shape of a flat plate having a longitudinal direction and a width direction, and an air hole 6a corresponding to the slit 5a of the spacer 5 is formed. The cover 6 is laminated and immobilized on the spacer 5. Thus, the space interposed between the spacer 5 and the cover 6 functions as a capillary. The sample, which is introduced from the opening (one end of the biosensor 1 in FIG. 2 (the left end part in FIG. 2)) formed by the slit 5a, is introduced into the capillary by the capillarity toward the air hole 6a.

<<Detection Layer>>

The detection layer 8, as illustrated in FIG. 2, is formed (immobilized) within the opening 4a. The detection layer 8 contains at least an enzyme, a crosslinking agent and an electrically conductive polymer. The detection layer 8 can further contain at least one of a sugar and electrically conductive particles.

(Enzyme)

Examples of the enzyme include oxidoreductases. Examples of the oxidoreductase include glucose oxidase (GOD), galactose oxidase, bilirubin oxidase, pyruvic acid oxidase, D- or L-amino acid oxidase, amine oxidase, cholesterol oxidase, choline oxidase, xanthine oxidase, sarcosine oxidase, L-lactic acid oxidase, ascorbic acid oxidase, cytochrome oxidase, alcohol dehydrogenase, glutamate dehydrogenase, cholesterol dehydrogenase, aldehyde dehydrogenase, glucose dehydrogenase (GDH), fructose dehydrogenase, sorbitol dehydrogenase, lactate dehydrogenase, malate dehydrogenase, glycerol dehydrogenase, 17B hydroxysteroid dehydrogenase, estradiol 17B dehydrogenase, amino acid dehydrogenases, glyceraldehyde 3-phosphoric acid dehydrogenase, 3-hydroxysteroid dehydrogenase, diaphorase, cytochrome oxidoreductase, catalase, peroxidase, glutathione reductase and the like. Of these, oxidoreductases of sugars are preferable. Examples of the oxidoreductase of sugars include glucose oxidase (GOD), galactose oxidase, glucose dehydrogenase (GDH), fructose dehydrogenase and sorbitol dehydrogenase.

The oxidoreductase can further contain, as a catalytic subunit and a catalytic domain, at least one of pyrroloquinoline quinone (PQQ) and flavin adenine dinucleotide (FAD). Examples of the oxidoreductase containing PQQ include PQQ glucose dehydrogenase (PQQGDH). Examples of the oxidoreductase containing FAD include cytochrome glucose dehydrogenase (Cy-GDH) and glucose oxidase (GOD), which have an FAD-containing α-subunit.

The oxidoreductase can further contain an electron transfer subunit or an electron transfer domain. Examples of the electron transfer subunit include subunits, which have a heme with the function of electron exchange. Examples of the oxidoreductase containing such a heme-containing subunit include those containing cytochrome, and for example glucose dehydrogenase and a fusion protein of PQQGDH and cytochrome can be used.

Examples of the enzyme containing an electron transfer domain include cholesterol oxidase and quinoheme ethanol dehydrogenase (QHEDH(PQQ Ethanol dh)). For the electron transfer domain, it is further preferable to use domains containing cytochrome, which has a heme with the function of electron exchange. Examples include "QHEDH" (fusion enzyme; GDH with heme domain of QHGDH), sorbitol dehydrogenase (Sorbitol DH), D-fructose dehydrogenase (Fructose DH), *Agrobacterium tumefasience*-derived Glucose-3-Dehydrogenase (G3DH from *Agrobacterium tumefasience*) and cellobiose dehydrogenase.

Note that the above fusion protein of PQQGDH and cytochrome, which is the example of the subunit containing cytochrome, and the cytochrome domain of PQQGDH, which is the example of the domain containing cytochrome, are disclosed in, for example, International Publication No. WO2005/030807.

Further, for the oxidoreductase, an oligomer enzyme composed of at least a catalytic subunit and a subunit containing cytochrome having a heme with the function of electron acceptor can be used.

Note that the substance to be measured can be any substrate of the oxidoreductase. For example, cellobiose dehydrogenase oxidizes cellobiose but also oxidizes glucose, because of which glucose can also be used as the substance to be measured.

(Electrically Conductive Polymer)

Examples of the electrically conductive polymer include polypyrrole, polyaniline, polystyrene sulfonate, polythiophene, polyisothianaphthene, polyethylene dioxythiophene (poly(3,4-ethylenedioxythiophene)poly(styrene sulfonate)), the combinations thereof and the like. Examples of the commercial products thereof include, as the polypyrrole, "SSPY" (ethyl 3-methyl-4-pyrrolecarboxylate) (manufactured by KAKENSANGYOU CORPORATION) and the like. Examples also include, as the polyaniline, "AquaPASS 01-x" (manufactured by TA Chemical Co., Ltd.) and the like. Examples further include, as the polystyrene sulfonate, "Poly-NaSS" (manufactured by TOSOH ORGANIC CHEMICAL CO., LTD.) and the like. Examples include, as the polythiophene, "ESPACER 100" (manufactured by TA Chemical Co., Ltd.) and the like. Examples include, as the polyisothianaphthene, "ESPACER 300" (manufactured by TA Chemical Co., Ltd.) and the like. Examples include, as the polyethylene dioxythiophene (poly(3,4-ethylenedioxythiophene)poly(styrene sulfonate)), "PEDOT-PSS" (Polyscience, Inc.) and the like. Additionally, electrically conductive polymers with various properties (e.g., water solubility) can be used. Functional groups of the electrically conductive polymers preferably have a hydroxy group or a sulfo group.

(Crosslinking Agent)

Examples of the type of crosslinking agent (binder) include, specifically as the aldehyde group-containing compound, glutaraldehyde, formaldehyde, malonaldehyde, terephthalaldehyde, isobutyraldehyde, valeraldehyde, isovaleraldehyde, cinnamaldehyde, nicotinaldehyde, glyceraldehyde, glycoaldehyde, succinaldehyde, adipaldehyde, isophthalaldehyde, terephthalaldehyde and the like. Examples include, as the carbodiimide group-containing compound, hexamethylene diisocyanate, hydrogenated xylylene diisocyanate, xylylene diisocyanate, 2,2,4-trimethylhexamethylene diisocyanate, 1,12-diisocyanate dodecane, norbornane diisocyanate, 2,4-bis-(8-isocyanateoctyl)-1,3-dioctylcyclobutane, 4,4'-dicyclohexylmethane diisocyanate, tetramethylxylylene diisocyanate, isophorone diisocyanate and the like.

The carbodiimide group-containing compounds are also commercially available under the names of CARBODILITE V-02, CARBODILITE V-02-L2, CARBODILITE V-04, CARBODILITE V-06, CARBODILITE E-01, CARBODILITE E-02, CARBODILITE V-01, CARBODILITE V-03, CARBODILITE V-05, CARBODILITE V-07, CARBODILITE V-09 (all are product names, manufactured by Nisshinbo Chemical Inc.) and the like.

Examples include, as the maleimide group-containing compound, m-maleimidobenzoyl-N-hydroxysuccinimide ester, sulfonsuccinimidyl 4-(p-maleimidophenyl)butyrate, m-maleimidobenzoyl sulfosuccinimide ester, N-γ-maleimidobutyryloxysuccinimide ester, succinimidyl 4-(N-maleidomethyl)cyclohexane 1-carboxylate, N-succinimidyl-2-maleimidoacetic acid, N-succinimidyl-4-maleimidobutyric acid, N-succinimidyl-6-maleimidohexanoic acid, N-succinimidyl-4-maleimidomethylcyclohexane-1-carboxylic acid, N-sulfosuccinimidyl-4-maleimidomethylcyclohexane-1- carboxyl is acid, N-succinimidyl-4-maleimidomethylbenzoate, N-succinimidyl-3-maleimidobenzoate, N-succinimidyl-4-maleimidophenyl-4-butyric acid, N-sulfosuccinimidyl-4-maleimidophenyl-4-butyric acid, N,N'-oxydimethylene-dimaleimide, N,N'-o-phenylene-dimaleimide, N,N'-m-phenylene-dimaleimide, N,N'-p-phenylene-dimaleimide, N,N'-hexamethylene-dimaleimide, N-succinimidyl maleimide carboxylate and the like. Examples also include commercial products such as SANFEL BM-G (manufactured by SANSHIN CHEMICAL INDUSTRY CO., LTD.) and the like.

Examples include, as the oxazoline group-containing compound, oxazoline compounds such as 2,2'-bis-(2-oxazoline), 2,2'-methylene-bis-(2-oxazoline), 2,2'-ethylene-bis-(2-oxazoline), 2,2'-trimethylene-bis-(2-oxazoline), 2,2'-tetramethylene-bis-(2-oxazoline), 2,2'-hexamethylene-bis-(2-oxazoline), 2,2'-octamethylene-bis-(2-oxazoline), 2,2'-ethylene-bis-(4,4'-dimethyl-2-oxazoline), 2,2'-p-phenylene-bis-(2-oxazoline), 2,2'-m-phenylene-bis-(2-oxazoline), 2,2'-m-phenylene-bis-(4,4'-dimethyl-2-oxazoline), bis-(2-oxazolinylcyclohexane)sulfide, bis-(2-oxazolinylnorbornane)sulfide and the like.

Examples include, as the addition polymerizable oxazoline compound, 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline and the like, and polymerized or copolymerized compounds of one or more thereof can be used.

The oxazoline group-containing compounds are also commercially available under the names of EPOCROS WS-500, EPOCROS WS-700, EPOCROS K-1010E, EPOCROS K-1020E, EPOCROS K-1030E, EPOCROS K-2010E, EPOCROS K-2020E, EPOCROS K-2030E, EPOCROS RPS-1005, EPOCROS RAS-1005 (all manufactured by NIPPON SHOKUBAI CO., LTD.), NK Linker FX (manufactured by Shin-Nakamura Chemical Co., Ltd.) and the like.

Examples specifically include, as the epoxy group-containing compound, sorbitol polyglycidyl ether, polyglycerol polyglycidyl ether, diglycerol polyglycidyl ether, glycerol polyglycidyl ether, trimethylolpropane polyglycidyl ether, ethylene glycol diglycidyl ether, polyethylene glycol diglycidyl ether, propylene glycol diglycidyl ether, polypropylene glycol diglycidyl ether and the like, and two or more of these compounds can also be used in combination. The epoxy group-containing compounds are also commercially available under the names of Denacol EX-611, Denacol EX-612, Denacol EX-614, Denacol EX-614B, Denacol EX-512, Denacol EX-521, Denacol EX-421, Denacol EX-313, Denacol EX-314, Denacol EX-321, Denacol EX-810, Denacol EX-811, Denacol EX-850, Denacol EX-851, Denacol EX-821, Denacol EX-830, Denacol EX-832, Denacol EX-841, Denacol EX-861, Denacol EX-911, Denacol EX-941, Denacol EX-920, Denacol EX-145 and Denacol EX-171 (all are product names, manufactured by Nagase ChemteX Corporation), SR-PG, SR-2EG, SR-8EG, SR-8EGS, SR-GLG, SR-DGE, SR-4GL, SR-4GLS and SR-SEP (all are product names, manufactured by Sakamoto Yakuhin Kogyo Co., Ltd.), Epolite 200E, Epolite 400E and Epolite 400P (all are manufactured by KYOEISHA CHEMICAL Co., LTD.) and the like.

The type of crosslinking agent is not limited to the above compounds and commercial products but may be any compounds containing at least one functional group of an aldehyde group, a maleimide group, a carbodiimide group, an oxazoline group and an epoxy group. The form of crosslinking agent is not limited and may be in the form of a monomer or a polymer.

(Sugar)

The sugar is a sugar which does not serve as a substrate for the enzyme, and the number of constituent sugar of the sugar is, for example, 1 to 6, and preferably 2 to 6. The sugar may be a D-form or an L-form, or a mixture thereof, and can be used singly or two or more thereof can be used in combination as appropriate. However, in the case where a sugar such as glucose is used as a measurement object, a sugar which is different from the sugar to be the measurement object and which does not serve as a substrate for the enzyme is used as the sugar.

Examples of the disaccharide include xylobiose, agarobiose, carrabiose, maltose, isomaltose, sophorose, cellobiose, trehalose, neotrehalose, isotrehalose, inulobiose, vicianose, isoprimeverose, sambubiose, primeverose, solabiose, melibiose, lactose, lycobiose, epicellobiose, sucrose, turanose, maltulose, lactulose, epigentibiose, robinobiose, silanobiose, rutinose and the like.

Examples of the trisaccharide include glucosyl trehalose, cellotriose, chacotriose, gentianose, isomaltotriose, isopanose, maltotriose, manninotriose, melezitose, panose, planteose, raffinose, solatriose, umbelliferose and the like.

Examples of the tetrasaccharide include maltosyl trehalose, maltotetraose, stachyose and the like. Examples of pentasaccharides include maltotriosyl trehalose, maltopentaose, verbascose and the like. Examples of the hexasaccharide include maltohexaose and the like.

(Electrically Conductive Particles)

The detection layer 8 can further contain electrically conductive particles. For the electrically conductive particles, metal particles such as gold, platinum, silver or palladium, or higher-order structures made of a carbon material, can be used. The higher-order structure can contain, for example, one or more fine particles (carbon fine particles) selected from electrically conductive carbon black, carbon nanotube (CNT) and fullerene. Examples of the electrically conductive carbon black include Ketjenblack (manufactured by Degussa AG), BLACK PEARL (Cabot Corporation) and the like.

The detection layer 8 on the working electrode 3A can further contain electrically conductive macromolecules. The electrically conductive macromolecule is preferably those that are water-soluble, and examples include polyaniline, polyethylene dioxythiophene and the like, with sulfonated polyaniline aqueous solution (trade name aquaPASS) manufactured by Mitsubishi Rayon Co., Ltd. being as a representative example.

<Method for Producing Biosensor>

The above biosensor 1 is, for example, produced as follows. Specifically, a carbon layer which functions as the electrode 3 is formed on one surface of the insulating base plate 2. For example, a carbon ink is screen printed on one surface of the insulating base plate 2 in the form of film having a predetermined thickness (e.g., about 100 μm). Thus, a carbon film having a desired thickness (e.g., about 10 μm) is formed. Instead of the carbon layer, a metal layer having a desired thickness (e.g., about 30 nm) can also be formed by forming a film by depositing a metallic material by physical vapor deposition (PVD, e.g., sputtering) or chemical vapor deposition (CVD).

Next, the insulation layer 4 is formed on the electrode 3. The insulation layer 4 is, for example, patterned by screen printing using a resist ink for the formation.

Next, the detection layer 8 is formed on the electrode 3. Specifically, a solution (reagent) containing an enzyme, an electrically conductive polymer, a crosslinking agent and the like is prepared. The reagent may contain at least one of a sugar and electrically conductive particles. When a sugar is contained, the concentration of the sugar is preferably from 0.1 to 2 wt %, and more preferably 0.2 to 2 wt %. The solution (reagent) is dropped into the opening 4a of the insulation layer 4 and fills the opening 4a. The detection layer 8 is formed on the working electrode 3A when the solution (reagent) in the opening 4a is solidified by drying on the working electrode 3A.

Alternatively, the detection layer 8 may be formed by filling the opening 4a with the reagent in the form of a paste or a gel in and solidifying the reagent. The detection layer 8 may further be formed, without forming the insulation layer 4, by screen printing the detection layer 8 in the form of a paste or a gel on the working electrode 3A so that the contact area of the working electrode 3A with the detection layer 8 has a predetermined area, followed by solidification by drying.

After forming the detection layer 8, the biosensor 1 can be obtained by aligning and adhering the spacer 5 to a base material and further aligning and adhering the cover 6 to the spacer 5.

A biosensor unit provided with a plurality of the biosensors 1, which have the configuration described above, may also be formed. In such a case, the biosensor unit is formed so that the enzyme in each biosensor has the same reaction rate and the area of the detection layer 8 contacting the working electrode 3A is approximately the same. The "approximately the same" means that, for example, the contact area of the working electrode with the detection layer in each biosensor is within an error range of 8% with respect to the designated predetermined area (designated value (also called theoretical value)). However, the error range may be within 4%, or within 2%.

<Measuring Apparatus>

Figure 3:
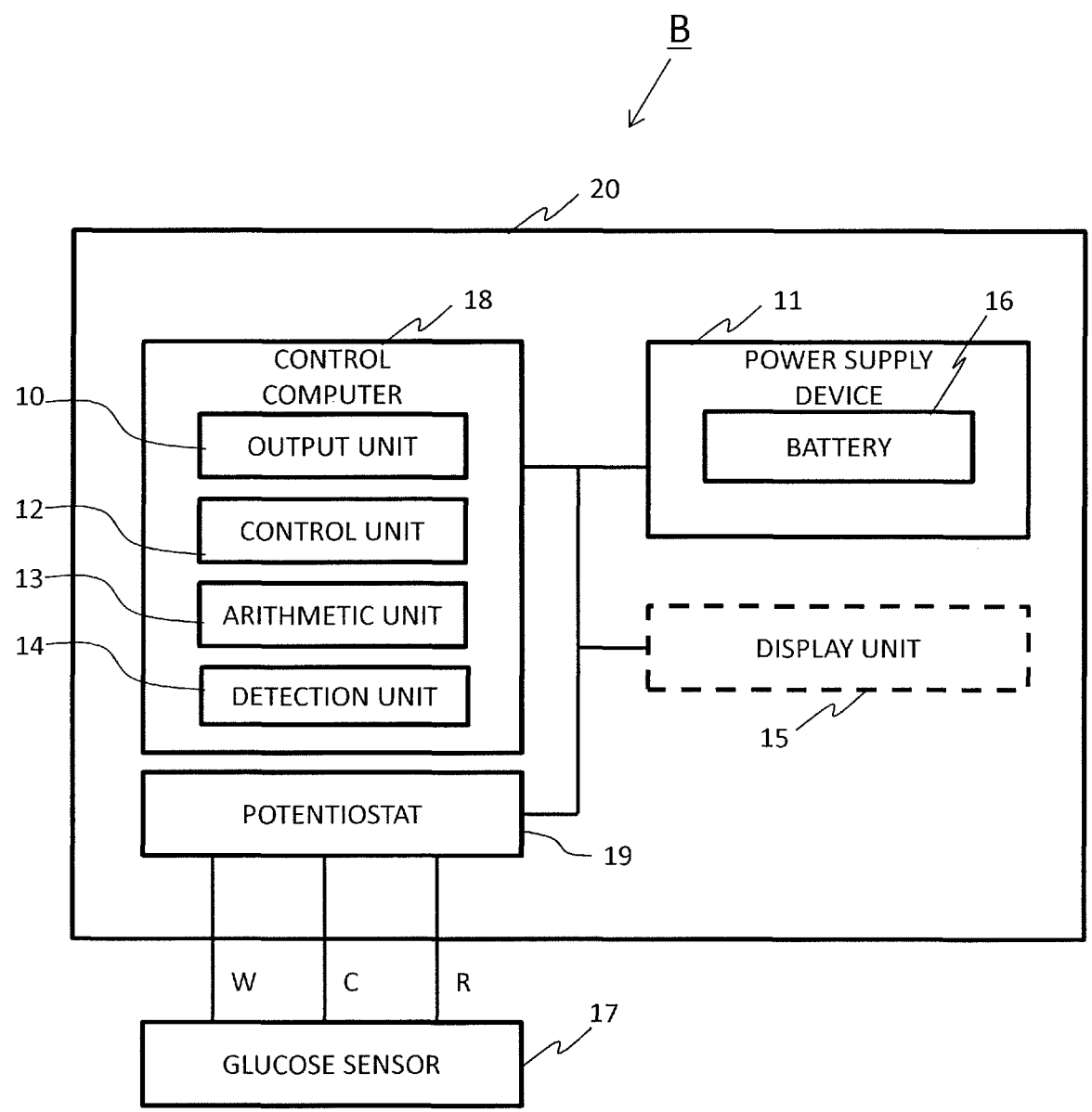
FIG. 3 is a drawing illustrating an example of the configuration of a measuring apparatus.

FIG. 3 is a drawing illustrating an example of the configuration of a measuring apparatus, which measures a concentration of a substance to be measured using the biosensor 1. The glucose sensor 17 illustrated in FIG. 3 is an example of the biosensor 1 and has the configuration described using FIG. 1 and FIG. 2. The measuring apparatus B is a glucose measuring apparatus, which measures a glucose (blood sugar) concentration using the glucose sensor 17. However, the configuration of the measuring apparatus B described below is an example, and the measuring apparatus of the present invention is not limited to the following embodiment.

FIG. 3 illustrates an example of the configuration of main electronic components housed in the measuring apparatus B. In FIG. 3, a control computer 18, a potentiostat 19 and a power supply device 11 are provided on a base plate 20 housed in a housing.

The control computer 18 includes, as hardware, a processor such as CPU (Central Processing Unit), recording media such as memories (e.g., RAM (Random Access Memory) and ROM (Read Only Memory)) and the communication unit. When the processor loads a program stored in the recording medium (e.g., ROM) to the RAM and executes the program, the control computer 18 functions as an apparatus including an output unit 10, a control unit 12, an arithmetic unit 13 and a detection unit 14. The control computer 18 may also include an auxiliary memory such as a semiconductor memory (EEPROM or flash memory) or a hard disk.

The control unit 12 controls the timing for applying the voltage, the value of the voltage to be applied and the like. The power supply device 11 includes a battery 16 and supplies electricity to the control computer 18 and the potentiostat 19 for operation. It is also possible to dispose the power supply device 11 outside the housing.

The potentiostat 19 is a device which maintains the potential of the working electrode 3A constant with respect to the reference electrode 3C and is controlled by the control unit 12. The potentiostat 19 applies a predetermined amount of voltage between the counter electrode 3B and the working electrode 3A of the glucose sensor 17 using terminals C, R, W each corresponding to the counter electrode 3B, the reference electrode 3C and the working electrode 3A, measures the response electric current of the working electrode 3A obtained at the terminal W, and sends the measurement results of the response electric current to the detection unit 14.

The arithmetic unit 13 calculates and stores the concentration of the substance to be measured (glucose) based on the value of the detected electric current. The output unit 10 carries out data communication with the display unit 15 and sends the calculated result of the concentration of the substance to be measured (glucose), which is provided by the arithmetic unit 13, to the display unit 15. The display unit 15 is capable of displaying, for example, the calculated result of the glucose concentration received from the measuring apparatus B, on a display screen in a predetermined format.

Figure 4:
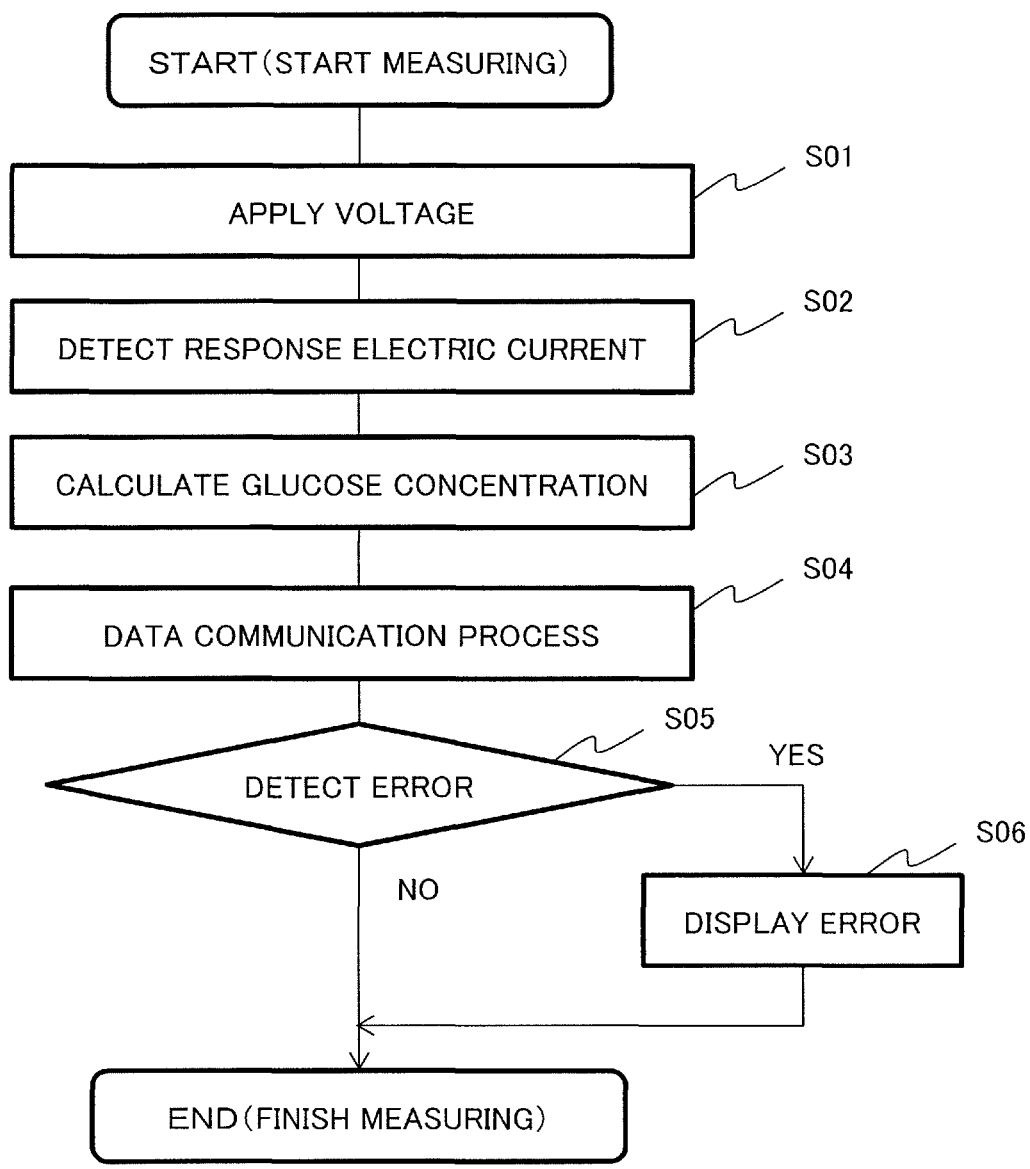
FIG. 4 is a flow chart illustrating an example of the processing sequence carried out by the measuring apparatus.

FIG. 4 is a flow chart illustrating an example of the processing sequence of the glucose concentration measurement carried out by the control computer 18. The CPU (control unit 12) of the control computer 18 receives an instruction to start the measurement of the glucose concentration. The control unit 12 controls the potentiostat 19 to apply a predetermined amount of voltage to the working electrode 3A, and starts measuring the response electric current from the working electrode 3A (Step S01). Note that the detection of the installation of the glucose sensor 17 to the measuring apparatus B may be used as the instruction to start the concentration measurement.

The method for applying the voltage to the electrode is not particularly limited. Stepwise application is preferable to efficiently measure a charge transfer limiting current. The voltage to be applied is preferable 600 mV or less, and more preferably 100 mV or less. The lower limit is not particularly limited, and for example is 10 mV or more.

Next, the potentiostat 19 measures the response electric current generated by the application of voltage, specifically, the charge transfer limiting current based on the transfer to the electrode of electrons derived from the substance to be measured (glucose, herein) in the sample, and sends the measured current to the detection unit 14 (Step S02). As the charge transfer limiting current, the steady-state current after the occurrence of the transient current due to the charging of an electric double layer, for example, 1 to 20 seconds after the application of voltage, is measured.

The arithmetic unit 13 carried out arithmetic processing based on the electric current value and calculates the glucose concentration (Step S03). For example, the formulae for calculating the glucose concentration or the data of the calibration curve of the glucose concentration, which correspond to an enzyme (e.g., glucose dehydrogenase) contained in the detection layer 8 disposed on the working electrode 3A, are preinstalled to the arithmetic unit 13 in the control computer 18. The arithmetic unit 13 calculates the glucose concentration using these calculation formulae or the calibration curve.

The arithmetic unit 13, for example, can calculate the concentration of the substance to be measured (glucose) from the measured electric current value based on the formula (1). It is alternatively possible that a calibration curve is created in advance using a sample with a known concentration and the concentration is calculated from the measured electric current value based on the calibration curve. The concentration of the specimen can also be calculated by multiplying the formula (1) by the correction coefficient found by the test or the like. In this case, the correction coefficient is also included in the constant term X of the formula (2). The measurement of the response electric current may be carried out continuously or intermittently.

The output unit 10 sends the calculated result of the glucose concentration to the display unit 15, through a communication link provided with the display unit 15 (Step S04). Thereafter, the control unit 12 determines if there are any measurement errors detected (Step S05), completes the measurement if there is no error and displays the glucose concentration on the display unit. If there are any errors, a notification of error is displayed, and then the flow sequence illustrated in FIG. 4 is completed.

Test 1

Example 1

As the material for the electrode 3, an electrically conductive carbon ink (FTU series, manufactured by Asahi Chemical Research Laboratory Co., Ltd.) was used. The electrically conductive carbon ink was patterned by screen printing on one surface of a polyethylene terephthalate sheet (E-22, manufactured by Tray Industries, Inc.) (length 50 mm, width 5 mm, thickness 250 μm) as the insulating base plate 2 to form three electrode patterns. Further, in Example 1, a silver-silver chloride ink (manufactured by BAS Inc.) was applied to one of the three electrode patterns, dried at 80° C. for 20 minutes to form a silver-silver chloride electrode as the reference electrode 3C.

Next, the insulation layer 4 was formed by screen printing an insulation resin polyester ink (UVF series, manufactured by Asahi Chemical Research Laboratory Co., Ltd.) so that openings 4a, 4b and 4c were formed on the above electrode 3. The bottom area of the opening 4a was set to be 0.5 mm$^2$.

An enzyme reagent, which contains cytochrome-containing glucose dehydrogenase (CyGDH), electrically conductive particles (Ketjenblack), electrically conductive macromolecules (polyaniline) as an electric conduction assisting agent and a binder (an oxazoline group-containing water-soluble polymer), was prepared, and 0.04 μL of which was dropped into the opening 4a and dried at 100° C. for 120 minutes to form the detection layer 8. The enzyme reagent has the final concentrations as follows.
(Formulation of Enzyme Reagent)
KJB: 0.60 wt %
Enzyme (Cy-GDH): 7 mg/mL
Phosphate buffer solution: 5 mM (pH 5.8)
Crosslinking agent (binder) (EPOCROS WS-700, manufactured by NIPPON SHOKUBAI CO., LTD.) 3.00% (w/v)
Polyaniline (aquaPASS, manufactured by Mitsubishi Rayon Co., Ltd.) 0.20% (w/v)
Trehalose 0.25 wt % (used as a protection material of the enzyme)

Comparative Example 1

Figure 5:
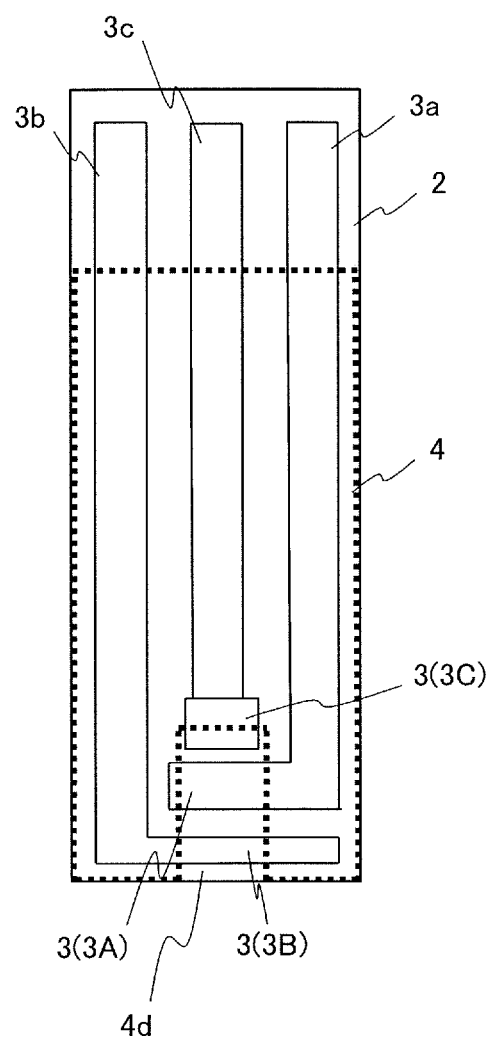
FIG. 5 is a drawing illustrating an example of the configuration of the biosensor according to Comparative Example 1.

An example of the configuration of the biosensor according to Comparative Example 1 is illustrated in FIG. 5. FIG. 5 illustrates the configuration of the enzyme electrode (the insulating base plate 2, the electrode 3, the insulation layer 4) constituting a part of the biosensor. The insulation layer 4 has a printing pattern different from Example (FIG. 1), and the working electrode 3A, the counter electrode 3B and the reference electrode 3C are exposed by an opening 4d. 0.04 μL of the liquid reagent prepared with the above formulation was dropped onto the working electrode 3A and dried at 100° C. for 120 minutes to form a detection layer. The material, configuration and size of Comparative Example 1, except what is described above, are the same as Example 1. In Comparative Example 1, the contact area of the working electrode with the detection layer is not controlled.

<Chronoamperometry Measurement>

The electrode response properties of the glucose sensors of Example 1 and Comparative Example 1 were evaluated by chronoamperometry measurement. Chronoamperometry measurement was carried out by introducing whole bloods having glucose concentrations of 100 mg/dL, 300 mg/dL and 600 mg/dL into a sample introduction unit of the glucose sensors and subsequently applying a voltage of 200 mV to the working electrode in a stepwise manner to measure the response electric currents.

CV values (simultaneous repeatability) 5 seconds after from the start of voltage application are presented in Table 1, and CV values 30 seconds after from the start of voltage application are presented in Table 2.

TABLE 1

| 5 sec | CV value corresponding to Glucose concentration | | | |
|---|---|---|---|---|
| | 100 | 300 | 600 | mg/dL |
| Example 1 | 1.63 | 3.77 | 2.91 | % |
| Comparative Example 1 | 1.63 | 3.77 | 2.91 | % |

TABLE 2

| 30 sec | CV value corresponding to Glucose concentration | | | |
|---|---|---|---|---|
| | 100 | 300 | 600 | mg/dL |
| Example 1 | 1.56 | 1.98 | 2.52 | % |
| Comparative Example 1 | 4.84 | 3.47 | 3.85 | % |

In any of the concentrations, the CV values of Example 1 obtained satisfactory values than the CV values of Comparative Example 1. Thus, it is revealed that the CV value is improved, specifically errors between the biosensors are decreased and the accuracy is stabilized, when the area of the detection layer (reagent layer) on the working electrode is controlled.

Further, whole bloods having a glucose concentration of 0, 100 mg/dL, 300 mg/dL, 600 mg/dL and 800 mg/dL respectively were introduced into the sample introduction unit of the sensors of Example 1 and Comparative Example 1, and subsequently a voltage of 200 mV was applied to the working electrode in a stepwise manner to measure the response electric currents. The results of the chronoamperometry measurement of Example 1 are presented in FIG. 6 (the number of samples n=5 to 6), and the results of the chronoamperometry measurement of Comparative Example 1 are presented in FIG. 7 (the number of samples n=5).

Figure 6:
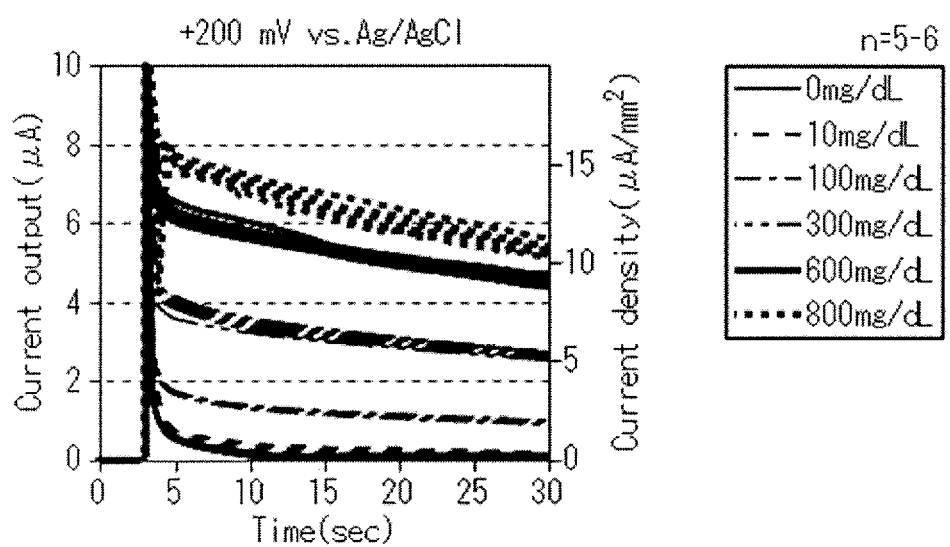
FIG. 6 is a graph depicting the results of a chronoamperometry measurement carried out using the biosensor of Example 1.
Figure 7:
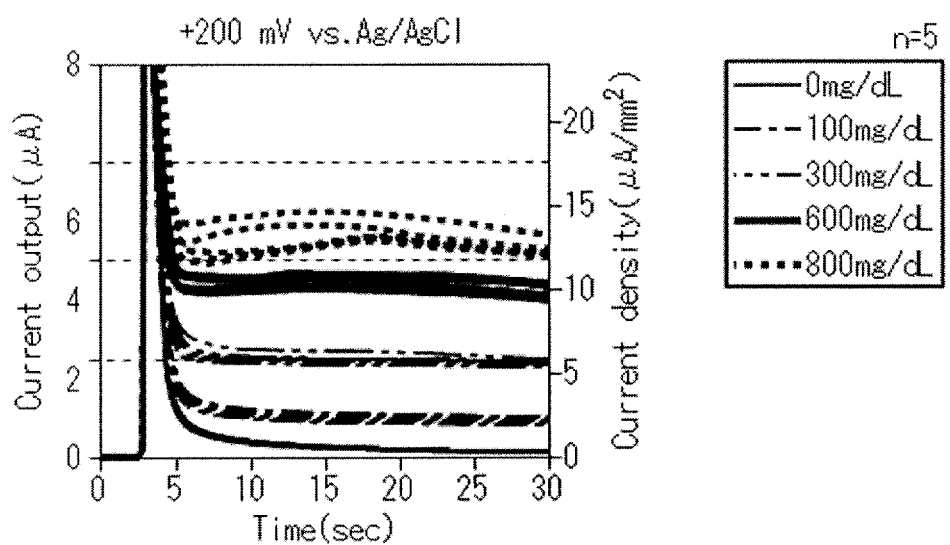
FIG. 7 is a graph depicting the results of a chronoamperometry measurement carried out using the biosensor of Comparative Example 1.

As revealed in FIG. 6 and FIG. 7, the response electric current waveforms are inconsistent between the samples in Comparative Example 1, whereas the waveforms in Example 1 are more consistent (closer) than Comparative Example 1. This reveals that, in Example 1, the inconsistencies of the response electric currents between the samples can be reduced by the area control of the detection layer 8.

Test 2

Example 2

For Example 2, the liquid reagent having the formulation described in Example 1 was dropped (dispensed) onto the working electrode of the enzyme electrode described as Comparative Example 1 to obtain biosensors of Example 2. As the biosensors of Example 2, the biosensor with the area of the reagent taking up the entire area of the working electrode (W electrode), the biosensor with the reagent taking up ½ of the area of the working electrode and the biosensor with the reagent taking up ¼ of the area of the working electrode were prepared.

Comparative Example 2

For Comparative Example 2, the liquid reagent having the formulation described in Example 1 from which the crosslinking agent was removed was dropped (dispensed) onto the working electrode of the enzyme electrode described as Comparative Example 1 to obtain biosensors of Comparative Example 2. As the biosensors of Comparative Example 2, the biosensor with the area of the reagent occupying the entire area of the working electrode (W electrode), the biosensor with the reagent occupying ½ of the area of the working electrode and the biosensor with the reagent occupying ¼ of the area of the working electrode were prepared. In both Example 2 and Comparative Example 2, the reagent was dispensed so as not to be out of the working electrode.

For each biosensor of Example 2 and Comparative Example 2, whole bloods each having a glucose concentration of 300 mg/dL and 600 mg/dL were introduced into the sample introduction unit of the sensors, and subsequently a voltage of 200 mV was applied to the working electrode in a stepwise manner to measure the response electric currents after a lapse of 20 seconds.

Figure 8:
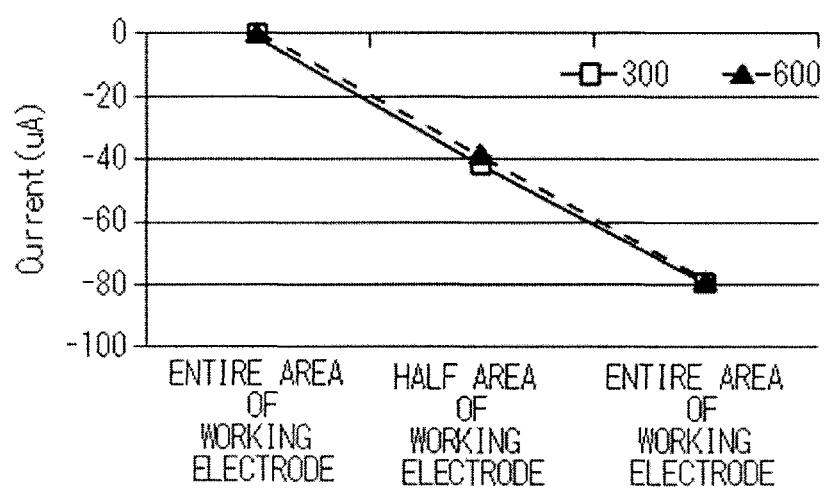
FIG. 8 is a graph depicting the results of a chronoamperometry measurement carried out using the biosensor of Example 2.
Figure 9:
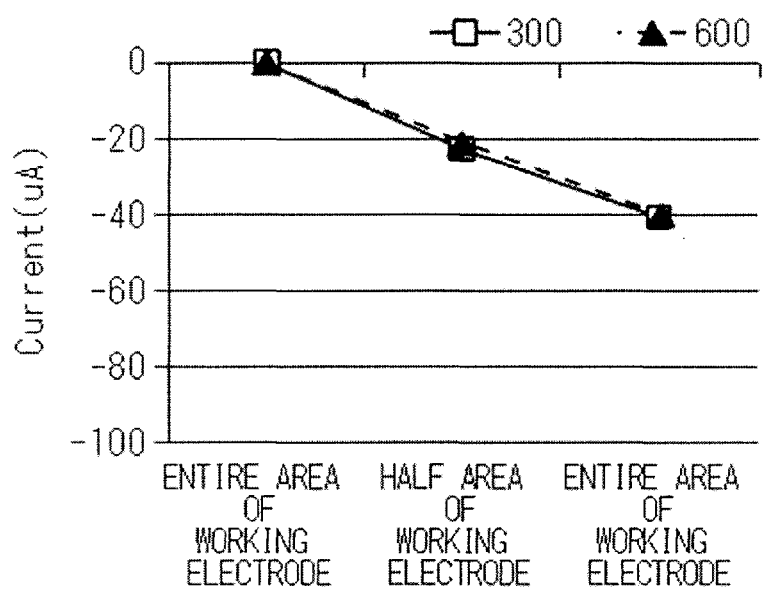
FIG. 9 is a graph depicting the results of a chronoamperometry measurement carried out using the biosensor of Comparative Example 2.

FIG. 8 presents ratios of the measurement results of the response electric current values 20 seconds after the voltage was applied to the biosensors of Example 2, and FIG. 9 presents ratios of the measurement results of the response electric current values 20 seconds after the voltage was applied to the biosensors of Comparative Example 2.

As presented in FIG. 8 and FIG. 9, it is confirmed that, in Example 2, the response electric current values are reduced, when compared with Comparative Example 2 regardless the glucose concentrations, in proportion to the percentage of the reagent area taking up on the working electrode. Specifically, in Example 2, it was revealed that when the reagent containing the crosslinking agent (detection layer) was used, the biosensor with the response electric current value suitably depending on the area of the reagent can be obtained.

What is claimed is:

1. A method of manufacturing a biosensor, comprising:
    forming a capillary interposed between a spacer and a cover;
    forming a plurality of electrodes including a working electrode on an insulating base plate;
    forming an insulation layer partially covering the working electrode and comprising an opening exposing a part of the working electrode wherein the opening has a circular planar shape and a connected inner wall; and
    forming, in the opening of the insulation layer on the working electrode, a detection layer containing an enzyme for exchanging electrons with the working electrode, a crosslinking agent and an electrically conductive polymer and having a contact area with the working electrode defined by a predetermined area, wherein the predetermined area is determined based on a reaction rate of the enzyme,
    wherein the electrically conductive polymer is not conjugated to the crosslinking agent.

2. The method of manufacturing a biosensor according to claim 1, wherein the forming the detection layer on the working electrode includes application of a material for the detection layer to the working electrode.

3. The method for manufacturing a biosensor according to claim 1, wherein the electrically conductive polymer is polyaniline that is not conjugated to the crosslinking agent.

4. The method for manufacturing a biosensor according to claim 1, wherein the enzyme includes cytochrome-containing glucose dehydrogenase.

5. The method according to claim 1, wherein the enzyme is surrounded by polyaniline.

6. The method for manufacturing a biosensor according to claim 1, wherein the crosslinking agent comprises an agent selected from the group consisting of 2,2'-bis-(2-oxazoline), 2,2'-methylene-bis-(2-oxazoline), 2,2'-ethylene-bis-(2-oxazoline), 2,2'-trimethylene-bis-(2-oxazoline), 2,2'-tetramethylene-bis-(2-oxazoline), 2,2'-hexamethylene-bis-(2-oxazoline), 2,2'-octamethylene-bis-(2-oxazoline), 2,2'-ethylene-bis-(4,4'-dimethyl-2-oxazoline), 2,2'-p-phenylene-bis-(2-oxazoline), 2,2'-m-phenylene-bis-(2-oxazoline), 2,2'-m-phenylene-bis-(4,4'-dimethyl-2-oxazoline), bis-(2-oxazolinylcyclohexane)sulfide, bis-(2-oxazolinylnorbornane)sulfide, 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline.

7. The method according to claim 1, wherein the opening exposes only the part of the working electrode.

8. The method according to claim 1, wherein the opening does not expose the insulating base plate.

* * * * *